US005304313A

United States Patent [19]

Berger

[11] Patent Number: 5,304,313

[45] Date of Patent: Apr. 19, 1994

[54] CHEMICAL COMPOSITIONS AND METHODS OF USING THEM IN SPRAYING TO FIGHT FIRES AND TO COOL HEATED SURFACES RAPIDLY

[75] Inventor: Paul H. Berger, Rome, N.Y.

[73] Assignee: Metro Fire & Rescue, Inc., Lynchborg, Va.

[21] Appl. No.: 951,390

[22] Filed: Sep. 25, 1992

Related U.S. Application Data

[63] Continuation of Ser. No. 775,288, Oct. 11, 1991, abandoned.

[51] Int. Cl.[5] .......................... A62D 1/00; C09K 5/00

[52] U.S. Cl. ...................................... 252/3; 252/8.05; 252/307; 252/351; 169/46

[58] Field of Search .................. 252/8.05, 351, 3, 307; 169/45, 46, 47

[56] References Cited

U.S. PATENT DOCUMENTS

| | | | |
|---|---|---|---|
| 3,541,010 | 5/1971 | Dingman et al. | 252/3 OR |
| 3,578,590 | 5/1971 | Neineker et al. | 252/8.05 OR |
| 3,772,195 | 11/1973 | Francen | 252/8.05 OR |
| 3,912,647 | 10/1975 | Adell | 252/8.05 OR |
| 3,920,856 | 11/1975 | Aepli et al. | 252/351 X |
| 4,090,967 | 5/1978 | Falk | 252/3 X |
| 4,398,605 | 8/1983 | Conklin et al. | 252/3 X |
| 4,476,687 | 10/1984 | Conklin et al. | 252/174.21 |
| 4,849,117 | 7/1989 | Bronner et al. | 252/3 OR |
| 4,913,740 | 4/1990 | Federickson | 106/1.11 OR |
| 5,009,710 | 4/1991 | Bewsey | 252/3 X |
| 5,089,559 | 2/1992 | Blount | 525/107 OR |

*Primary Examiner*—Robert L. Stoll
*Assistant Examiner*—Daniel S. Metzmaier
*Attorney, Agent, or Firm*—Whitham & Marhoefer

[57] ABSTRACT

The fire fighting and hot surface cooling methods of this invention use a composition formed by combining a nonionic surfactant possessing a specific photoexcitable functional group with an arylphosphate, also of photoexcitable nature, in a solvent medium of composition and content that allows for a convenient workable viscosity and is resistant to effects of freezing. The ultimate water solution used for spraying to extinguish a fire or cool a surface contains from 2000 ppm of the surfactant nonylphenolethoxylate and 94 ppm of the arylphosphate, poly(oxy-1,2-ethanediyl), α-phenol-ω-hydroxy-(2)-phosphate to 3000 ppm surfactant and 141 ppm arylphosphate. The spray solution is applied to the fire until the desired result occurs.

4 Claims, 1 Drawing Sheet

CHEMICAL COMPOSITIONS AND METHODS OF USING THEM IN SPRAYING TO FIGHT FIRES AND TO COOL HEATED SURFACES RAPIDLY

This application is a continuation of application Ser. No. 07/775,288, filed Oct. 11, 1991 now abandoned

FIELD OF THE INVENTION

The invention proposes a new approach to understanding the working of chemical concentrates which are introduced into water streams to increase radically their effectiveness when sprayed by conventional fire-fighting equipment to extinguish fires, even when well-fueled, and to cool rapidly surfaces of structures that have been heated by such fires to very elevated temperatures. Oil-well fires and their associated structures provide classic examples of a field of use for such sprayed, solute-containing water streams. The new approach referred to is to have the solute specially compounded to increase its fire and heat control effects through providing photo-excitable molecules.

BACKGROUND OF THE INVENTION

The direct background of the present invention is found in two prior art patents to Conklin and Mowry, U.S. Pat. No. 4,398,605 and 4,476,687. The first is entitled "Fire Extinguishing and 4476687., Composition and Method"; the second, "Cooling Metal Surfaces." Their stated objectives are those of the present invention: "* * * a fire-fighting liquid that extinguishes a fire quickly and, in particular, cool[s] the fire so that the high heat generated is rapidly reduced." ('605 patent, col. 1, lines 45–48); * * * the provision of a heated surface cooling solution and method for cooling metal surface particularly structural steel elements of a petroleum rig." ('687 patent, col. 1, line 67 to col. 2, line 2).

These two patents contain a clear discussion of the prior art relevant to their patentability which is here intended to be incorporated by reference, i.e.:

| | |
|---|---|
| Dingman | U.S. Pat. No. 3541010; |
| Nieneker | U.S. Pat. No. 3578590; |
| Francen | U.S. Pat. No. 3772195; |
| Adell | U.S. Pat. No. 3912647; |
| Falk | U.S. Pat. No. 4090967. |

Practice of the present invention achieves a dramatic improvement over the results that can actually be obtained by practicing the methods described and claimed by Conklin and Mowry in their '605 and '687 patents. This improvement can be realized to its fullest extent by utilizing two different aspects of the discoveries that underlie it. The first is in the specific novel combinations of chemical components to be used to make up the water solution concentrate which is added by the fire fighters to the water to be sprayed. The second is in the different concentration of nonionic chemicals to be included in the ultimate fire-fighting and cooling solution sprayed which is twice the maximum in % by volume of that permitted by the Conklin and Mowry disclosures. Thus, those disclosures state:

'605 patent, col. 5, lines 29–43:

> The fire fighting solution is formed from the concentrate solution in an amount such that the fire fighting solution contains between 0.02% to 0.2% by volume of the surfactant. Preferably, the fire fighting solution would have the surfactant in the concentration of between 0.03% to 0.1% by volume. When premixed from the concentrate to the specified concentration, the pump draws in the premixed fire fighting solution.
>
> "Concentration of this surfactant in the fire fighting solution is important in enabling the fire to be extinguished very rapidly. It has been found that the low concentration enables the fire to be smothered or choked off by a cloud generated from the fire fighting solution. The fire is extinguished more rapidly than with any other fire fighting composition. '687 patent, col. 4, lines 1–15:
>
> "The cooling solution is formed from the concentrate solution in an amount such that the solution contains between 0.02% to 0.2% by volume of the surfactant. Preferably, the solution would have the surfactant in the concentration of between 0.03% to 0.1% by volume. When premixed from the concentrate to the specified concentration, the pump draws in the premixed cooling solution.
>
> Concentration of this surfactant in the cooling solution is important in enabling the heat to be absorbed very rapidly from the metal surfaces. It has been found that the low concentration enables the heat to be absorbed by a cloud generated from the cooling solution so as to more rapidly cool the metal surfaces compared to any other liquid composition. The solution may contain solutes to a total of about 25% by weight.

In the present invention, on the other hand, surfactant concentration in the fire fighting solution is to be not less than 0.2% and preferably about 0.3% by volume, based on present experience.

SUMMARY OF THE INVENTION

The method of this invention uses a fire fighting and hot surface cooling spray solution formed from water and surfactant concentrate solution diluted when sprayed to contain more than 0.2% by volume of the surfactant. The concentrate differs from that of Conklin and Mowry in that it is comprised of one or more specific nonionic surfactants possessing a photoexcitable functional group and an aryl phosphate, also of a photoexcitable nature, in a solvent medium of composition and content that allows for convenient, workable viscosity and is resistant to the effects of freezing. A preferred spray solution will contain from 2000 ppm of the surfactant, nonylphenolethoxylate, and 94 ppm of the aryl phosphate, poly(oxy-1,2-ethanediyl), α-phenol-ω-hydroxy-(2)-phosphate to 3000 ppm surfactant and 141 ppm aryl phosphate.

GENERAL DESCRIPTION

Figure 1:
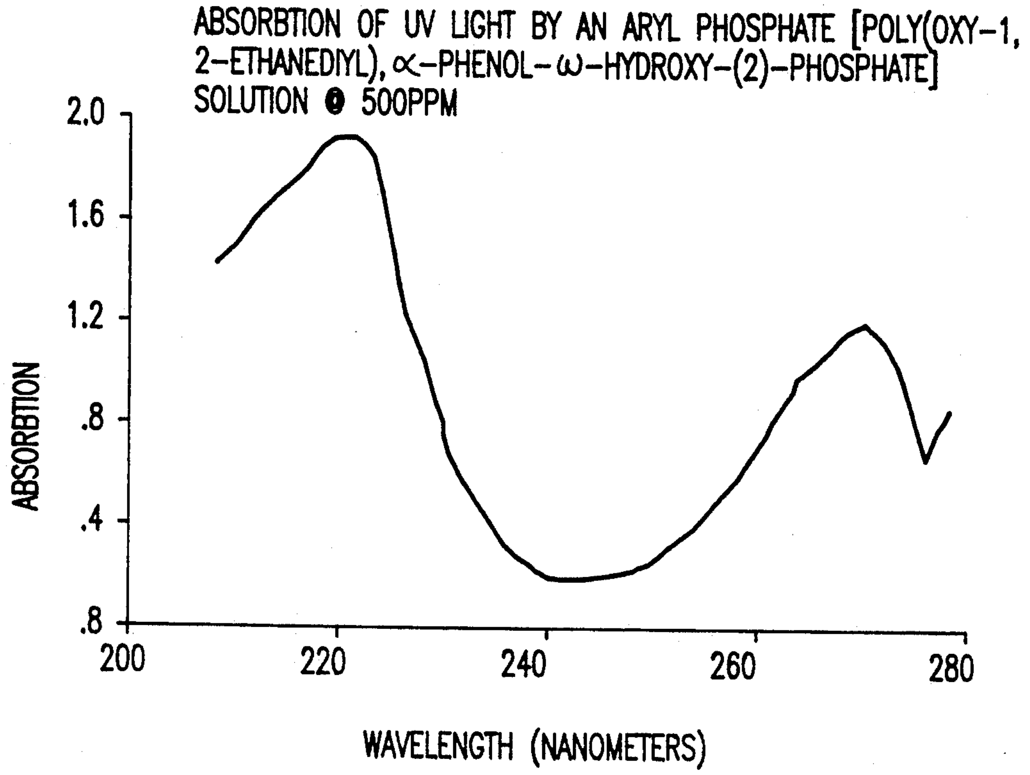
FIG. 1 is a plot of the spectral absorption qualities of ultra violet light by a 500 ppm water solution of the aryl phosphate poly(oxy-1,2-ethanediyl), α-phenol-ω-hydroxy-(2)-phosphate.

In common fire control terminology combustible materials are often referred to as Class A and Class B. Class A materials are ordinary combustible solids and include wood, cotton, paper, and the like; Class B materials are inflammable liquids and include gasoline, benzene, and other liquid hydrocarbons. Fires involving these materials are conveniently referred to as Class A and Class B fires. They can be described as chaotic oxidation of numerous classes of organic compounds. The chemical yield of such reactions is equally chaotic and includes many classes of organic compounds in addition to $H_2O$, $CO_2$, and CO. Important in understanding the present invention is to keep in mind the common denominator of all combustion reactions, namely, that the products yielded are at a much lower total Gibbs free energy state than the fuel reactants. In the process of achieving this lower energy state a great photon yield of radiant energy is delivered. This is evidenced by the various colors and wave lengths present with flame emissions.

The flame emission line for carbon is at 248.35 NM. The Balmer series of emission lines for hydrogen range from the red at 656.3 NM through the blue-green at 486.2 NM, blue at 434.1 NM, and ending at the ultra violet at 364.6 NM. The Lyman series of emission lines occur in the far ultra violet beginning at 121.6 NM and ending at 91.2 NM. These emissions, by striking the fuel load directly and by striking adjacent bodies that reradiate, are responsible for propagating the violent sets of reactions present in the combustion of organic materials. Following the methods of this invention interferes with these reactions by providing a continuous stream of molecules that will absorb the high energy radiant emissions from the combustion process. These molecules are of such structure that they will absorb a photon, elevate to an excited state, and revert to the ground state within a period of $10^{-3}$ to $10^{-8}$ seconds. Thus, the compositions of the invention may be described as agents that will absorb high energy photons emitted during combustion.

The spray used in the method of this invention is essentially water as the solvent containing as solute the active material, i.e., the prescribed concentrations of the compositions just described, poly(oxy-1,2-ethanediyl), α-phenol-ω-hydroxy-(2)-phosphate, sold by Mona Industries of Paterson, N.J., under the trade name Monalube 210 and which is commercially referred to as e.g., nonylphenolethoxylate and the aryl phosphate, phenol 6 phosphate. The solute components are dissolved, typically in water, to form the concentrate solution in which the composition is usually sold and shipped. This concentrate usually has about 25% by weight of the active material solutes. The concentrate is fed into the spray water by the fire control personnel using conventional pumping equipment to produce a spray solution containing more than 0.2%, preferably about 0.3%, solutes by volume.

DETAILED DESCRIPTION

It is postulated that the present invention works by providing an agent that will absorb the high energy photons that are emitted during combustion. Once absorbed in the Pi electron structure of the aryl functional group, this energy is reradiated as the Pi electrons return to the ground state, at a longer wave length, since that structure is not a perfect blackbody. Being of longer wave length and lower energy, the reradiant photons are not of sufficient energy levels to propagate the violent combustion reactions. The aryl phosphate, poly(oxy-1,2-ethanediyl), α-phenol-ω-hydroxy-(2)-phosphate, has been found to have complimentary spectral absorption qualities (FIG. 1) to that of nonylphenolethoxylate (FIG. 2), and has a stabilizing electronic configuration in the phospho-enol functional group. Compositions employing photon capture technology according to the present invention comprise various concentrations. In the following example, it was found that 3000 ppm of nonylphenolethoxylate and 141 ppm of the aryl phosphate, poly(oxy-1,2-ethanediyl), α-phenol-ω-hydroxy-(2)-phosphate, in the spray allowed an extremely difficult fire to be extinguished in outstandingly short time. Liquid propane at its own vapor pressure, ambient temp. 90° F., was flowed through a 0.5 in. dia. line to a 1.5 in. dia. "Christmas Tree" structure comprised of 3 flange connected valves with leaking flanges and ignited. When the resulting fire had fully evolved, flames reached 30 feet and infrared temperature readings from the steel pipe exceeded 1400° F. A water spray containing 3000 ppm of nonylphenolethoxylate and 141 ppm of the aryl phosphate, poly(oxy-1,2-ethanediyl), α-phenol-ω-hydroxy-(2)-phosphate, extinguished the fire in 4 seconds; all attempts using water alone failed.

I claim:

1. A composition of matter, comprising agents that have molecules that rapidly absorb high energy radiant emission produced during combustion, said agents comprising a mixture of a surfactant and an aryl phosphate, wherein said surfactant is nonylphenolethoxylate and said aryl phosphate is poly(oxy-1,2-ethanediyl), α-phenol-ω-hydroxy-(2)-phosphate, said surfactant and said aryl phosphate being present in such amounts in a solution that said solution extinguishes a fire or cools a hot surface rapidly.

2. The composition of claim 1, wherein said solution contains from about 2,000 ppm of nonylphenolethoxylate and 94 ppm of poly(oxy-1,2-ethanediyl), α-phenol-ω-hydroxy-(2)-phosphate to about 3,000 ppm of nonylphenolethoxylate and 141 ppm of poly(oxy-1,2-ethanediyl), α-phenol-ω-hydroxy-(2)-phosphate.

3. A method of cooling a hot surface or extinguishing a fire, comprising the step of applying to a hot surface or a fire, a solution comprising a mixture of a surfactant and an aryl phosphate, wherein said surfactant is nonylphenolethoxylate and said aryl phosphate si poly(oxy-1,2-ethanediyl), α-phenol-ω-hydroxy-(2)-phosphate, said surfactant and said aryl phosphate being present in such amounts in a solution that said solution extinguishes a fire or cools a hot surface rapidly.

4. A method of cooling a hot surface or extinguishing a fire, comprising the step of applying to a hot surface or a fire, a solution comprising a mixture of a surfactant and an aryl phosphate, wherein said mixture contains from about 2,000 ppm of nonylphenolethoxylate and 94 ppm of poly(oxy-1,2-ethanediyl), α-phenol-ω-hydroxy-(2)-phosphate to about 3,000 ppm of nonylphenolethoxylate and 141 ppm of poly(oxy-1,2-ethanediyl), α-phenol-ω-hydroxy-(2)-phosphate, respectively.

* * * * *

UNITED STATES PATENT AND TRADEMARK OFFICE

CERTIFICATE OF CORRECTION

PATENT NO. : 5,304,313

DATED : April 19, 1994

INVENTOR(S) : Paul H. Berger

Figure 2:
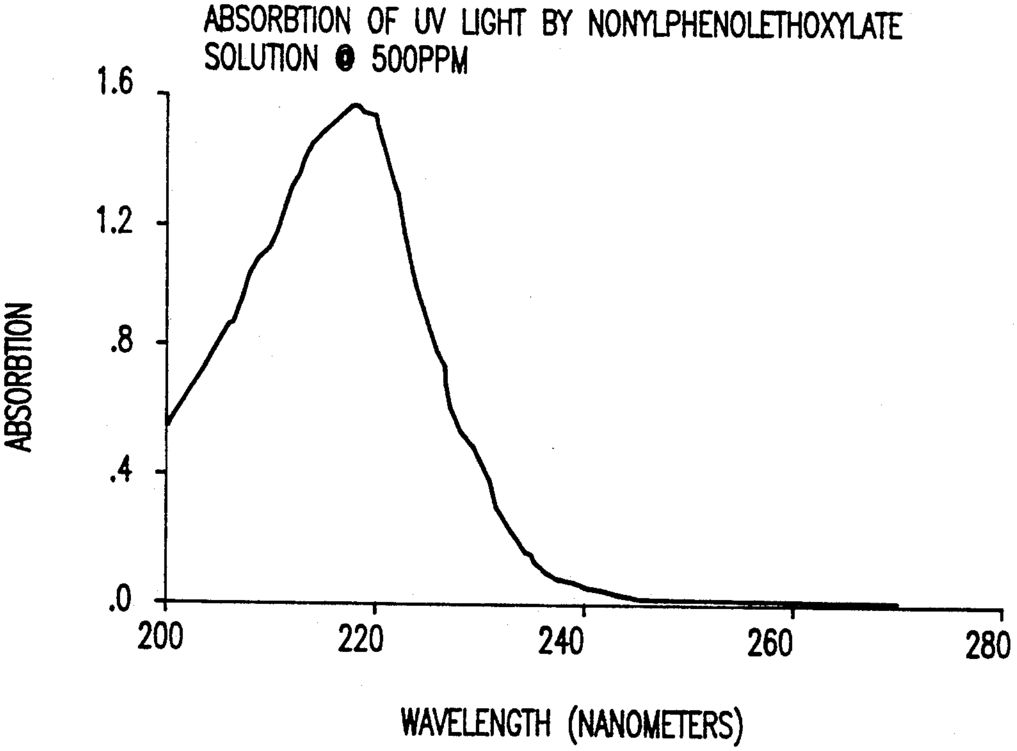
FIG. 2 is a plot of the spectral absorption qualities of ultra violet light by a 500 ppm water solution of nonylphenolethoxylate.

It is certified that error appears in the above-indentified patent and that said Letters Patent is hereby corrected as shown below:

In the drawings Fig. 2, should appear as shown on attached sheet.

Signed and Sealed this

Ninth Day of August, 1994

Attest:

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,304,313
DATED : April 19, 1994
INVENTOR(S) : Paul H. Berger

It is certified that error appears in the above-indentified patent and that said Letters Patent is hereby corrected as shown below:

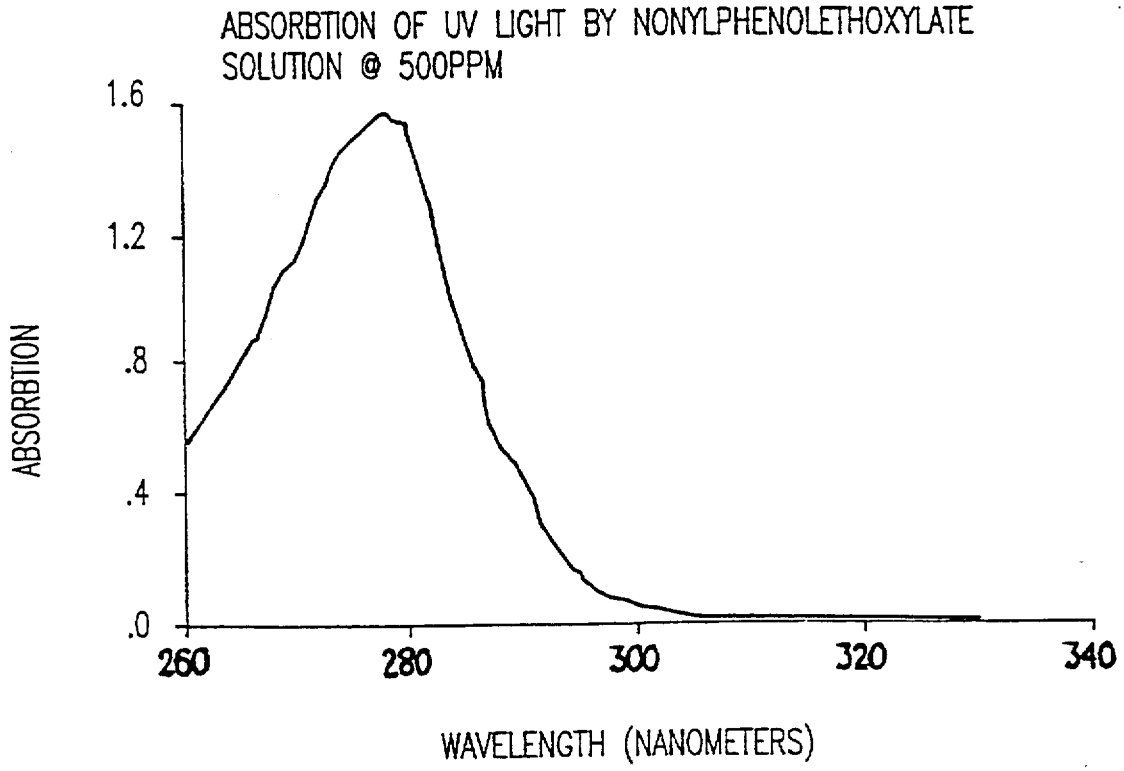

FIG.2